United States Patent
Rebollo Pimentel et al.

(10) Patent No.: US 10,585,446 B2
(45) Date of Patent: Mar. 10, 2020

(54) REFERENCE VOLTAGE GENERATOR CIRCUIT

(71) Applicant: NXP B.V., Eindhoven (NL)

(72) Inventors: Ivan Jesus Rebollo Pimentel, Graz (AT); Gerhard Martin Landauer, Graz (AT)

(73) Assignee: NXP B.V., Eindhoven (NL)

( * ) Notice: Subject to any disclaimer, the term of this patent is extended or adjusted under 35 U.S.C. 154(b) by 89 days.

(21) Appl. No.: 15/887,998

(22) Filed: Feb. 3, 2018

(65) Prior Publication Data

US 2018/0224879 A1   Aug. 9, 2018

(30) Foreign Application Priority Data

Feb. 3, 2017 (EP) .................................. 17154620

(51) Int. Cl.
G05F 3/24       (2006.01)
G06K 19/07     (2006.01)

(52) U.S. Cl.
CPC ......... *G05F 3/245* (2013.01); *G06K 19/0701* (2013.01)

(58) Field of Classification Search
CPC ............................................. G06K 19/0701
See application file for complete search history.

(56) References Cited

U.S. PATENT DOCUMENTS

| | | | |
|---|---|---|---|
| 2008/0297229 A1* | 12/2008 | Ramamoorthy | G05F 1/567 327/513 |
| 2011/0018520 A1 | 1/2011 | Imura | |
| 2011/0121809 A1 | 5/2011 | Camacho Galeano et al. | |
| 2015/0234401 A1* | 8/2015 | Porras | G05F 1/468 327/513 |

OTHER PUBLICATIONS

Nejad et al. "A high precision logarithmic-curvature compensated all CMOS voltage reference". Analog Integrated Circuits and Signal Processing. Aug. 18, 2018. p. 383-392. (Year: 2018).*
Extended European Search Report for Patent Appln. No. 17154620.3 (dated Jul. 17, 2017).
De Vita, G. et al. "A Sub-1-V, 10 ppm/°C, Nanopower Voltage Reference Generator", IEEE Journal of Solid-State Circuits, vol. 42, No. 7, pp. 1536-1542 (Jul. 2007).

(Continued)

*Primary Examiner* — Thien M Le
*Assistant Examiner* — Asifa Habib

(57) ABSTRACT

A reference voltage generator circuit (100) is disclosed, comprising a first transistor (101) having a first channel type and a second transistor (102) having a second channel type. A current source (104) is connected to a source terminal of the first transistor (101). A drain terminal of the second transistor (102) is connected to a drain terminal of the first transistor (101). The reference voltage generator circuit (100) further comprises a third transistor (103) having the second channel type, wherein a drain terminal of the third transistor (103) is connected to a source terminal of the second transistor (102). A node between the source terminal of the second transistor (102) and the drain terminal of the third transistor (103) is connected to a gate terminal of the first transistor (101). A connection for a reference voltage (Vrc) is provided between the current source (104) and the source terminal of the first transistor (101).

16 Claims, 4 Drawing Sheets

(56) References Cited

OTHER PUBLICATIONS

Liu, C.-C. et al. "An Ultra-Low Power Voltage Regulator for RFID Application", IEEE 56$^{th}$ International Midwest Symposium on Circuits and Systems, pp. 780-783 (Dec. 2, 2013).

Chouhan, S. S. et al. "A Simple All MOS Voltage Reference for RFID Applications", IEEE NORCHIP, 3 pgs. (Nov. 2013).

Chouhan, S. S. et al. "Design and implementation of all MOS micro-power voltage reference circuit", Springer, Analog Integrated Circuits and Signals Processing, vol. 80, No. 3, pp. 399-406 (Jul. 23, 2014).

Choi, M. et al. "A 23pW, 780ppm/°C resistor-less current reference using subthreshold MOSFETs", IEEE Computer Society, pp. 119-122 (2014).

Filanovsky, I.M. et al. "A CMOS Voltage Reference Using Compensation of Mobility and Threshold Voltage Temperature Effects", IEEE International Midwest Symposium on Circuits and Systems, pp. 29-32 (Aug. 2009).

Ma, H. et al. "A Sub-1V 115nA 0.34μm CMOS Voltage Reference for Ultra Low-Power Applications", IEEE 8$^{th}$ International Conference on ASIC, 4 pgs. (2009).

Filanovsky, I. M. et al. "Mutual Compensation of Mobility and Threshold Voltage Temperature Effects with Applications in CMOS Circuits", IEEE Transactions on Circuits and Systems—I: Fundamental Theory and Applications, vol. 48, No. 7, pp. 876-884 (Jul. 2001).

Vittoz, E. et al. "A Low-Voltage CMOS Bandgap Reference", IEEE Journal of Solid-State Circuits, vol. SC-14, No. 3, pp. 573-577 (Jun. 1979).

Camacho-Galeano, E. M. et al. "Temperature Performance of Sub-1V Ultra-Low Power Current Sources", IEEE International Symposium on Circuits and Systems, pp. 2230-2233 (2008).

\* cited by examiner

REFERENCE VOLTAGE GENERATOR CIRCUIT

CROSS-REFERENCE TO RELATED APPLICATIONS

This application claims the priority under 35 U.S.C. § 119 of European patent application no. 17154620.3, filed on Feb. 3, 2017, the contents of which are incorporated by reference herein.

FIELD

This disclosure relates to a reference voltage generator circuit.

BACKGROUND

Radio-frequency identification (RFID) tags are commonly used to store information that can be wirelessly interrogated. Information may be stored in a non-volatile memory contained in the tag. To reduce size and costs, passive RFID tags do not contain batteries; power is instead provided by an external field. For some operations, such as erasing and programing of the memory, a high-voltage is required. The high-voltage can be achieved with a charge pump, but the voltage level must be controlled to prevent damage to the tag and to ensure that the voltage is tuned for optimal memory performance. The voltage may be controlled using a reference voltage. A reference voltage should ideally provide a voltage that is constant across all operating temperatures of the tag.

Conventional techniques for producing a reference voltage, such as a bandgap reference voltage, typically require large currents (~1 µA) and/or take up a large physical area (~10000 µm$^2$). For a passive RFID tag, however, the available current and physical area is limited. Conventional reference voltages can therefore consume a high proportion of the available space and current of such RFID tags.

SUMMARY

According to a first aspect, there is provided a reference voltage generator circuit comprising:

a first transistor having a first channel type;

a current source connected to a source terminal of the first transistor;

a second transistor having a second channel type, wherein a drain terminal of the second transistor is connected to a drain terminal of the first transistor; and a third transistor having the second channel type, wherein a drain terminal of the third transistor is connected to a source terminal of the second transistor, a node between the source terminal of the second transistor and the drain terminal of the third transistor connected to a gate terminal of the first transistor, wherein a connection for a reference voltage is provided between the current source and the source terminal of the first transistor.

In some embodiments, the first channel type may be p-channel, and the second channel type n-channel. In other embodiments the first channel type may be n-channel and the second channel type p-channel.

The circuit may provide a reference voltage using only a small current, and requiring only a small physical area, making the reference voltage generator circuit particularly suitable for use in passive RFID tags, as well as in other applications having physical area and current limitations. The current source may be a current reference. The current source may be re-used from other components of a device or tag, for example a current reference may be required for other functions of the tag, which can be re-used to generate a reference voltage when a reference voltage is required.

In some embodiments the bulk terminal of the first transistor may be connected to the source terminal of the first transistor. A connection of the bulk terminal to the source terminal, rather than to a supply voltage rail, may provide a higher power supply rejection ratio and a greater independence of the reference voltage's temperature coefficient from the supply voltage.

A temperature dependence of the voltage at the node may compensate for a temperature dependence of the first transistor. The temperature dependence of the voltage at the node may be adapted to yield a stable and/or pre-selected temperature coefficient of the voltage reference. The pre-selected temperature coefficient may be zero, less than zero, or greater than zero. A stable temperature coefficient may mean that the temperature coefficient is substantially independent of temperature. Typically a MOS transistor has a negative temperature coefficient—i.e. the threshold voltage of the transistor reduces with temperature. The voltage at the node may have an opposite temperature coefficient to the first transistor, at least partially cancelling out any temperature effect of the first transistor, and so adjusting the temperature coefficient of the reference voltage, for example yielding a reference voltage with a stable and/or pre-selected temperature coefficient. In some embodiments, the temperature dependence of the voltage at the node may substantially cancel out any temperature dependence of the first transistor, yielding a reference voltage that is substantially independent of temperature, at least over a desired operating range of temperatures.

In some embodiments the geometrical sizes of the second and third transistors may be selected such that the temperature dependence of the voltage at the node compensates for the temperature dependence of the first transistor. In particular, the voltage at the node may be related to the ratio of width to length of the second transistor and the ratio of width to length of the third transistor. By selecting the physical size of the second and third transistors, the temperature coefficient of the voltage at the node can be controlled, allowing the temperature coefficient of the first transistor to be compensated for when generating the reference voltage. The temperature coefficient of the voltage at the node may be configured, by selecting appropriate dimensions of the second and third transistors, such that a pre-selected temperature coefficient of the reference voltage is provided. The pre-selected temperature coefficient may be positive, negative or zero, depending on the desired application.

In some embodiments, at least one of, or optionally each of, the first, second, and third transistors is a MOSFET.

In some embodiments, the reference voltage generator circuit may comprise the current source connected to the source terminal of the first transistor.

In some embodiments, the current source may be configured to provide a current that is substantially independent of temperature over the temperature range of −40° C. to 90° C. Substantially independent of temperature may mean that the current does not vary by more than 1% across the temperature range. In some embodiments the current source may be configured to provide a current having a linear temperature coefficient.

In some embodiments the current source may provide a current that varies with temperature such that the second differential of the current with respect to temperature is negative, i.e. with an inverted U shape. This variation with temperature may at least partially compensate for a temperature dependence of the voltage reference. In particular, due to second order effects, the voltage reference may have a voltage which varies with temperature such that the second differential of the voltage with respect to temperature is positive. The temperature dependence of the current may compensate for this, yielding a voltage reference which has a stable temperature coefficient.

The reference voltage may be substantially independent of temperature over the temperature range of −40° C. to 90° C. Substantially independent of temperature may mean that the voltage does not vary by more than 1% across the temperature range. Alternatively, the average reference voltage may vary by less than one standard deviation across the temperature range, as measured from a plurality (e.g. 3000 or more) of nominally identical circuits.

In some embodiments, the current source may be configured to provide a current of 100 nA or less, or 50 nA or less, or 25 nA or less. The geometrical area of the reference voltage generator circuit may be less than 200 μm² for a CMOS 140 nm technology node. The current requirement and physical size of the reference voltage generator circuit may thus be much less than for conventional reference voltage generator circuits.

According to a second aspect of the disclosure there is provided an RFID tag comprising the reference voltage generator circuit of any of the embodiments according to the first aspect. The reference voltage generator circuit of any of the embodiments according to the first aspect may alternatively be incorporated into other CMOS circuits, in particular low-power CMOS circuits.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
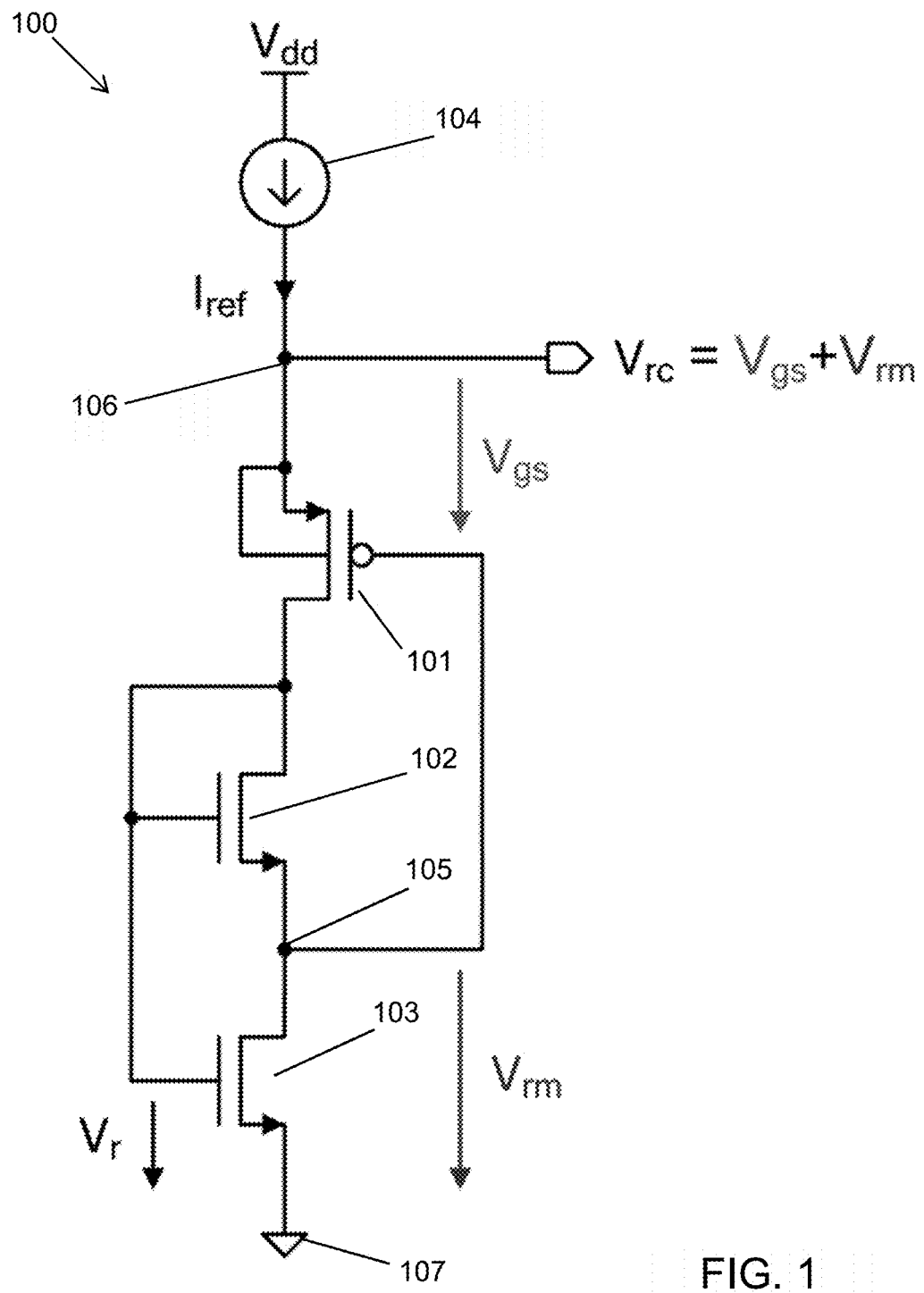
FIG. 1 is a schematic circuit diagram of a reference voltage generator circuit according to an example embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an example reference voltage generator 100. Generator 100 comprises a first transistor 101, a second transistor 102, and a third transistor 103. The illustrated transistors 101-103 are MOSFETs (metal-oxide-semiconductor field-effect transistors). First transistor 101 is a PMOS transistor (p-channel MOSFET). Second transistor 102 and third transistor 103 are NMOS transistors (n-channel MOSFETs).

A current source 104 is connected to the source terminal of the first transistor 101. A source voltage Vdd is connected to the first transistor 101 via the current source 104. The current source 104 may provide a current that is substantially constant with temperature, at least over typical operating temperatures of the generator 100, or may provide a current with some defined temperature dependence. The source of the third transistor 103 is connected to ground (gnd) 107.

The second and third transistors 102, 103 are connected in a self-biased cascode connection producing a voltage Vr across their gate terminals. For the purposes of generator 100, Vr may be ignored unless it is so high that transistor 101 can no longer function correctly.

The voltage Vrm (with reference to ground) at an intermediate node 105 between the source terminal of the second transistor 102 and the drain terminal of the third transistor 103 is used to gate the first transistor 101. The bulk terminal of the first transistor 101 is connected to the source terminal of the first transistor 101. A node 106 between the current source 104 and the source terminal of the first transistor 101 provides a connection point for outputting a reference voltage Vrc, which is equivalent to the sum of the voltage Vgs between the gate and source terminals of the first transistor 101 and Vrm.

Even with a temperature independent current source 104, the first transistor 101 introduces a temperature dependence to its outputs. As the given temperature dependence of the drain-source voltage of transistor 101 is often not desirable for circuit implementations, this introduced temperature dependence can be adjusted to a desired value. For instance, it can be adjusted to achieve a voltage reference that is constant, or near to constant, with temperature. This adjustment is achieved in generator 100 using the self-cascoded second and third transistors 102, 103. The voltage Vrm at the intermediate node 105 has a temperature dependence which depends upon the geometric properties of the second and third transistors 102, 103. In particular, the temperature dependence of Vrm can be described as:

$$\frac{\partial V_{rm}}{\partial T} \propto \ln\left(\frac{(w_{103}/l_{103})}{(w_{102}/l_{102})}\right),$$

where T is temperature, $w_{102}$ and $l_{102}$ are respectively the width and length of the second transistor 102, and $w_{103}$ and $l_{103}$ are respectively the width and length of the third transistor 103.

Thus, by appropriately selecting the geometrical properties of the second and third transistors 102, 103, the temperature dependence of the voltage Vrm can be tuned to be the opposite of the temperature dependence induced by the first transistor 101. The self-cascoded second and third transistors can therefore be used to compensate for the temperature dependence of the first transistor 101, so as to adjust the temperature coefficient of the reference voltage Vrc.

Figure 2:
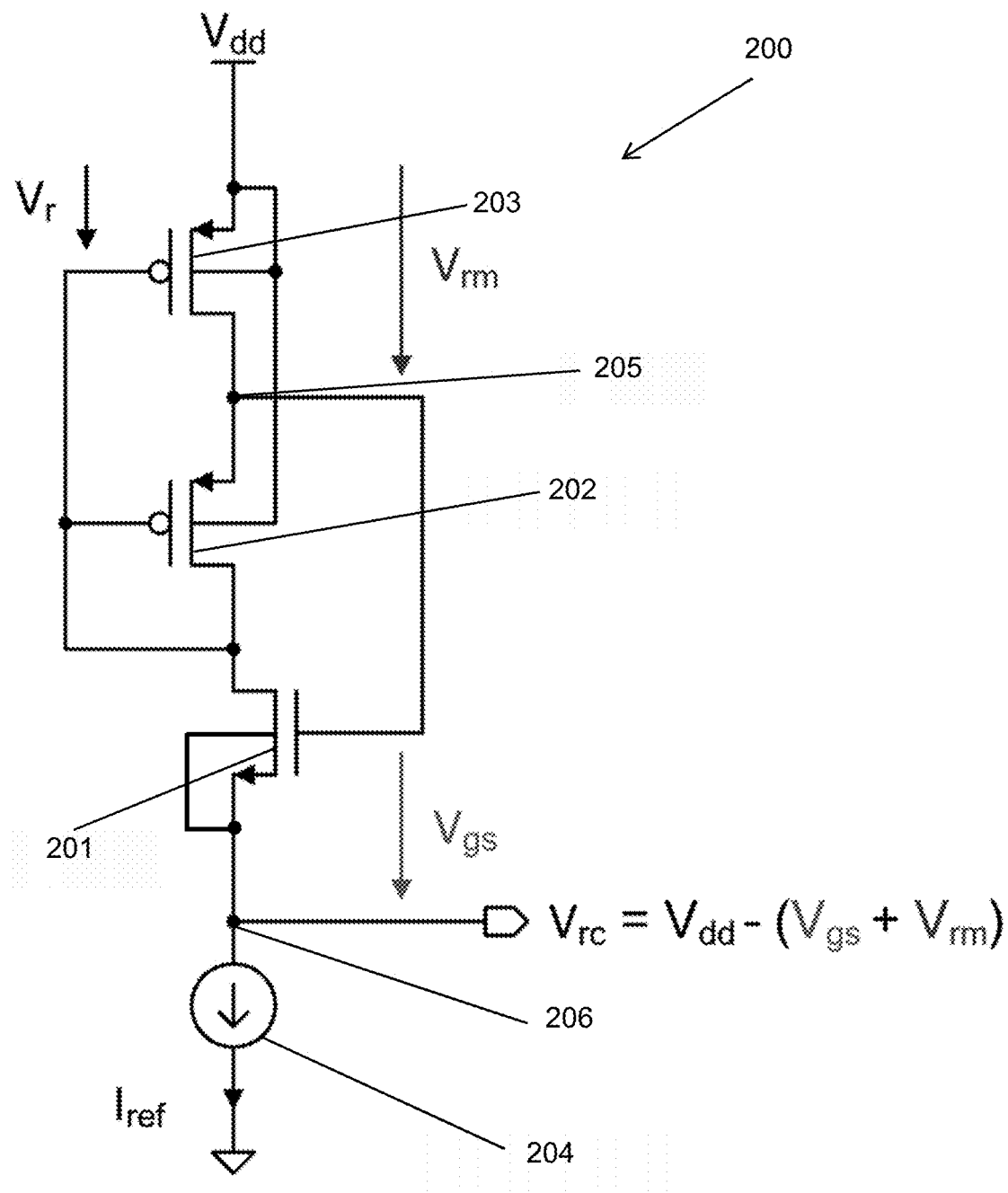
FIG. 2 is a schematic circuit diagram of a reference voltage generator circuit according to an alternative example embodiment.

FIG. 2 shows an alternative reference voltage generator circuit 200. Circuit 200 is substantially identical to circuit 100, but in this case the first transistor 201 is an NMOS transistor, and the second and third transistors 202, 203 are PMOS transistors. A current source 204 is connected to the source terminal of the first transistor 204. A supply voltage Vdd is connected to the source terminal of the third transistor 203. The intermediate node 205 is connected to the gate of the first transistor 201. The bulk terminal of the first transistor 201 is connected to the source terminal of the first transistor 201. A node 206 between the source termination of the first transistor 201 and the current source 204 provides a connection for outputting a reference voltage Vrc equivalent to the supply voltage Vdd minus the sum of the voltage Vgs between the gate and source terminals of the first transistor 101 and Vrm.

Figure 3:
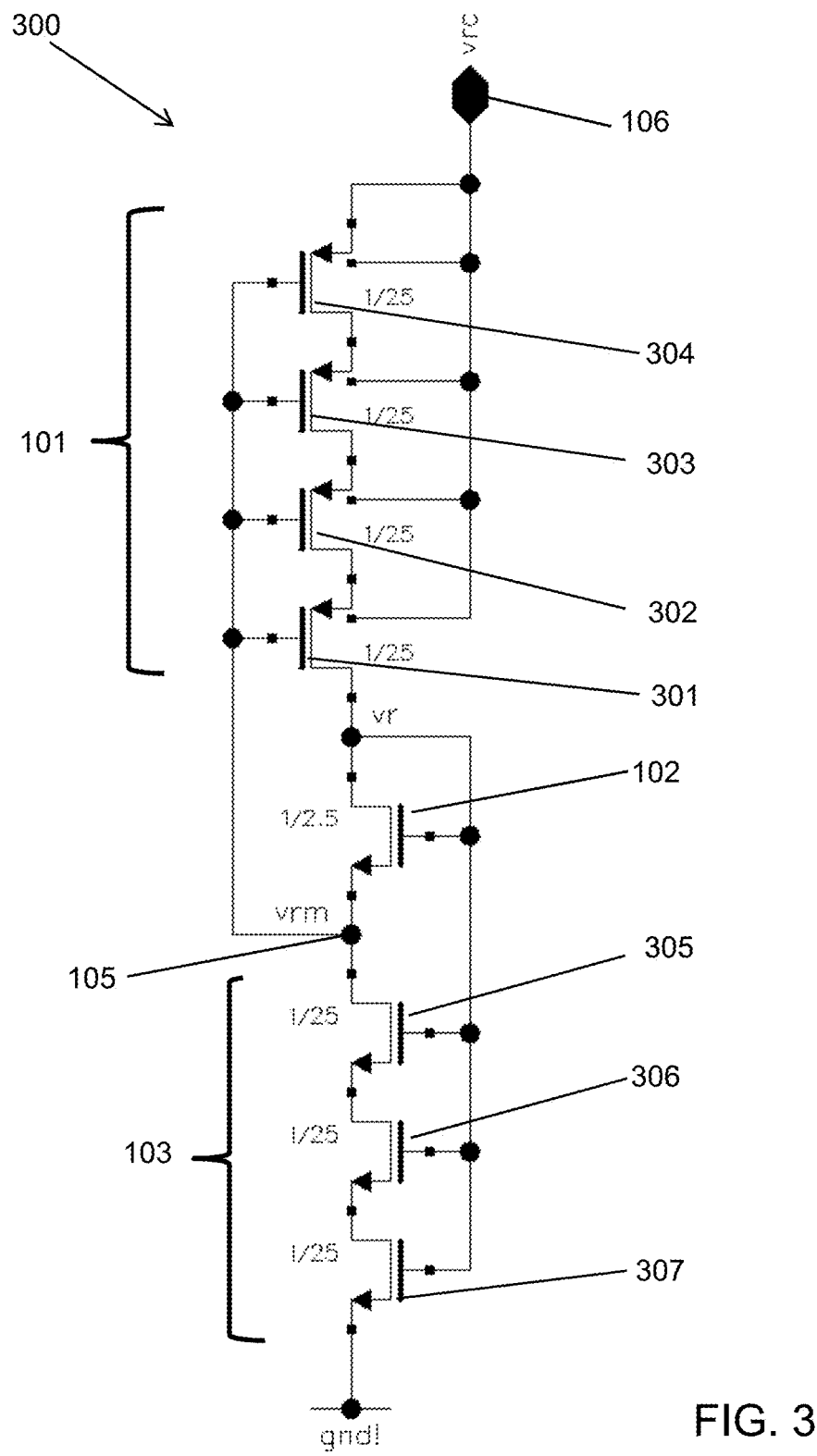
FIG. 3 is a circuit diagram of an alternative example of a reference voltage generator circuit of the type illustrated in FIG. 1.

FIG. 3 shows an alternative example of a reference voltage generator circuit 300. Circuit 300 is substantially similar to circuit 100. In circuit 300, first transistor 101 has in effect been separated into four transistors, 301-304, connected in a self-cascode arrangement. The source terminal of transistor 304 acts as the source terminal for the combined first transistor 101. The drain terminal of the transistor 301 acts as the drain terminal for the combined transistor 101, and is connected to the drain terminal of the second transistor 102. The gate of each transistor 301-304 forming the combined first transistor 101 is connected to the intermediate node 105. The bulk terminals of each of transistors 301-304 are connected together, and to the source terminal of the transistor 304 (i.e. the source terminal of the combined first transistor 101). A connection point 106 provides a connection for outputting the reference voltage Vrc.

The third transistor 103 has similarly been separated into three transistors 305-307, connected in a self-cascode arrangement. The drain terminal of the transistor 305 acts as the drain terminal of the combined third transistor 103 and is connected to the source terminal of the second transistor 102 via the intermediate node 105, and the source terminal of the transistor 307 acts as the source terminal of the combined third transistor 103, and is connected to ground.

In the illustrated embodiment, first transistors 301-304 are p-channel MOSFETs, and second and third transistors 102, 305-307 are n-channel MOSFETs. A current source (not shown) is connected to the source terminal of the transistor 304, i.e. at connection point 106. The figures adjacent to each transistor in FIG. 3 represent example width to length ratios that may be used for that transistor.

Figure 4:
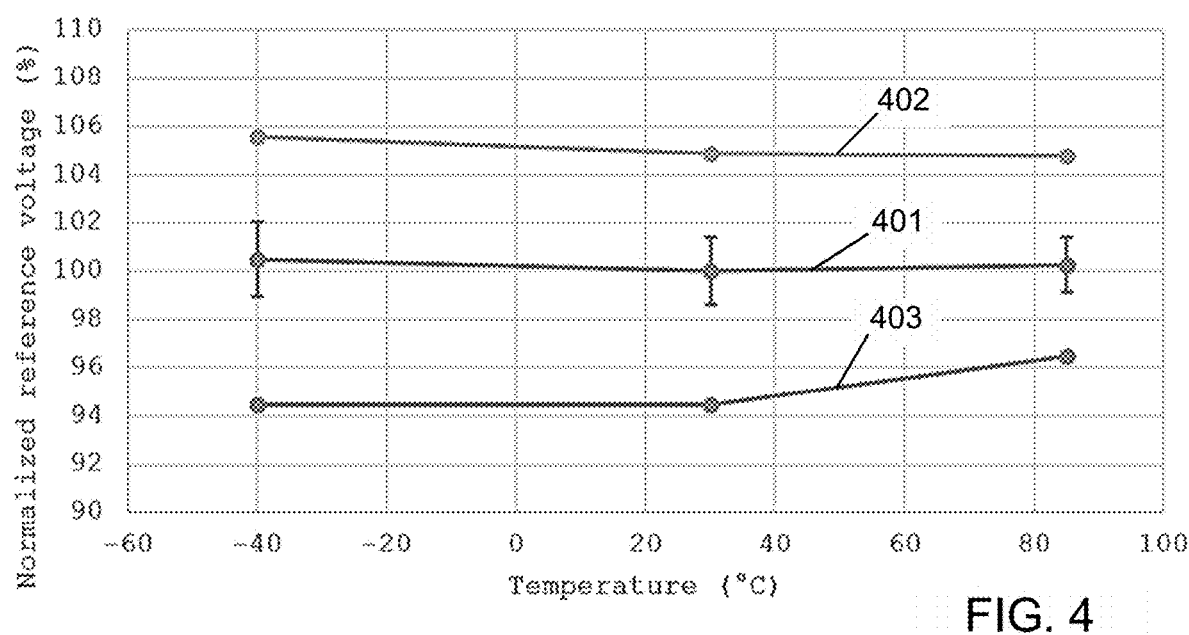
FIG. 4 is a plot of reference voltage as a function of temperature for an number of example reference voltage generator circuits.

To verify the operation of generator 300, more than 3000 samples of this type were made using a CMOS 140 nm technology node, and were individually tested to see how the reference voltage Vrc varied with temperature. FIG. 4 summarises the results, showing the reference voltage of the average of the samples (line 401) as a function of temperature, as well as results for the samples with the maximum (line 402) and minimum (line 403) voltages. The error bars on line 401 represent the standard deviation of the reference voltage of the samples. As can be seen in FIG. 4, the average reference voltage varies very little with temperature across the temperature range −40° C. to 80° C., varying by less than one standard deviation across the entire temperature range, or in other words the standard deviation in the reference voltage at any temperature is greater than the variation in average reference voltage across the temperature range. In all cases, a temperature-independent 25 nA reference current was used as the current source 104.

The reference voltage generator circuit according to this disclosure thus provides substantially temperature independent operation using a current of only 25 nA—far smaller than the current required for conventional reference voltages. Moreover, reference voltage generator circuits according to the present disclosure have been made with dimensions of less than 11 μm×14 μm, yielding an area much less than for conventional reference voltages. For purposes of comparison, a figure of merit, FoM, can be defined as FoM=Current×Voltage×Area. Conventional bandgap references have an $\text{FoM}_{Bandgap}$=1.1V*1 μA*10000 μm²=11000 μW μm². In contrast, a reference voltage generator circuit according to this disclosure may have an $\text{FoM}_{Vrc}$=1.1V*25 nA*200 μm²=5.5 μW μm²—much less than the conventional reference source. Reference voltage generator circuit 100 is therefore well suited to small area, low current applications, such as in passive RFID tags.

The results of the measurements also showed that process variations in manufacturing the generator circuits can introduce some variation in the absolute value of the voltage reference. However, it was found that the temperature coefficient of the voltage reference was substantially the same for all the samples. For circuits where the absolute value of the voltage reference is important, the reference voltage can be adjusted by trimming.

From reading the present disclosure, other variations and modifications will be apparent to the skilled person. Such variations and modifications may involve equivalent and other features which are already known in the art of reference voltages and RFID tags, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A reference voltage generator circuit comprising:
    a first transistor having a first channel type and having source terminal, a drain terminal, and a gate terminal;
    a current source connected to the source terminal of the first transistor;
    a second transistor having a second channel type opposite the first channel type and having a source terminal, a drain terminal, and a gate terminal, wherein the drain terminal of the second transistor is connected to the drain terminal of the first transistor; and
    a third transistor having the second channel type and having a source terminal, a drain terminal, and a gate terminal, wherein the drain terminal of the third transistor is connected to the source terminal of the second transistor, and a node between the source terminal of the second transistor and the drain terminal of the third transistor is connected to the gate terminal of the first transistor, wherein the respective gate of each of the second and third transistors is connected to the drain of the second transistor, and wherein a connection for a reference voltage is provided between the current source and the source terminal of the first transistor.

2. The reference voltage generator circuit of claim 1, wherein a temperature dependence of the voltage at the node compensates for a temperature dependence of the first transistor.

3. The reference voltage generator circuit of claim 2, wherein the geometrical sizes of the second and third transistors are selected such that the temperature dependence of the voltage at the node compensates for a temperature dependence of a gate-source voltage of the first transistor.

4. The reference voltage generator circuit of claim 2, wherein the temperature dependence of the voltage at the node is configured to yield a pre-selected temperature coefficient of the reference voltage.

5. The reference voltage generator circuit of claim 4, wherein the pre-selected temperature coefficient is positive, negative or zero.

6. The reference voltage generator circuit of claim 1, wherein a bulk terminal of the first transistor is connected to the source terminal of the first transistor.

7. The reference voltage generator circuit of claim 1, wherein at least one, or each, of the first, second, and third transistors is a MOSFET.

8. The reference voltage generator circuit of claim 1, wherein the current source is configured to provide a current that varies by less than 1% over the temperature range of −40° C. to 90° C.

9. The reference voltage generator circuit of claim 1, wherein the reference voltage varies by less than 1% over the temperature range of −40° C. to 90° C.

10. The reference voltage generator circuit of claim 1, wherein the current source is configured to provide a current of 100 nA or less, or 50 nA or less, or 25 nA or less.

11. The reference voltage generator circuit of claim 1, wherein the geometrical area of the reference voltage generator circuit is less than 200 µm$^2$.

12. The reference voltage generator circuit of claim 1, wherein the first channel type is p-channel and the second channel type is n-channel.

13. An RFID tag comprising the reference voltage generator circuit of claim 1.

14. The reference voltage generator circuit of claim 1, wherein the geometrical sizes of the second and third transistors are selected such that the temperature dependence of the voltage at the node is the opposite of a temperature dependence of a gate-source voltage of the first transistor.

15. The reference voltage generator circuit of claim 1, wherein the current source includes a terminal connectable to a supply voltage.

16. The reference voltage generator circuit of claim 1, wherein the current source includes a terminal connectable to ground.

* * * * *